(12) United States Patent
Suzuki et al.

(10) Patent No.: US 11,518,577 B2
(45) Date of Patent: Dec. 6, 2022

(54) LIQUID CONTAINER AND MANUFACTURING METHOD OF THE SAME

(71) Applicant: CANON KABUSHIKI KAISHA, Tokyo (JP)

(72) Inventors: Kazunori Suzuki, Niiza (JP); Norio Ogawa, Shiraoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 233 days.

(21) Appl. No.: 16/807,386

(22) Filed: Mar. 3, 2020

(65) Prior Publication Data

US 2020/0198839 A1 Jun. 25, 2020

Related U.S. Application Data

(63) Continuation of application No. PCT/JP2018/032232, filed on Aug. 30, 2018.

(30) Foreign Application Priority Data

Sep. 12, 2017 (JP) .............................. JP2017-175194

(51) Int. Cl.
*B65D 25/04* (2006.01)
*B29C 45/14* (2006.01)
(Continued)

(52) U.S. Cl.
CPC ........ *B65D 25/04* (2013.01); *B29C 45/14467* (2013.01); *B29K 2025/06* (2013.01); *B29L 2031/712* (2013.01)

(58) Field of Classification Search
CPC ...... B65D 25/04; B65D 47/06; B65D 47/127; B65D 85/72; B65D 1/04; B65D 21/01208;
(Continued)

(56) References Cited

U.S. PATENT DOCUMENTS 4,815,606 A * 3/1989 Airola .................. A61J 7/0069
206/532
7,195,347 B2 3/2007 Lee et al.
(Continued)

FOREIGN PATENT DOCUMENTS

CN 1504335 A 6/2004
CN 1511709 A 7/2004
(Continued)

OTHER PUBLICATIONS

International Search Report in International Application No. PCT/JP2018/032232 (dated Oct. 2018).
(Continued)

*Primary Examiner* — Shawn M Braden
(74) *Attorney, Agent, or Firm* — Venable LLP

(57) ABSTRACT

A liquid container includes a container portion and a lid. The container portion includes a plurality of storage portions separated by at least one partition rib and storing liquid respectively in an isolated state. The lid bonded with the container portion so as to cover an opening region of the container portion. A plurality of project portions engaging with the partition rib so as to sandwich the partition rib from both sides of the partition rib is integrally molded with the lid. In a state in which the partition rib is engaged with the project portions, a bonding portion is filled with bonding resin so as to seal a cavity between an edge end of the partition rib and the lid and a cavity between an edge end of an outer circumference of the container portion and the lid.

16 Claims, 11 Drawing Sheets

(51) Int. Cl.
  *B29K 25/00* (2006.01)
  *B29L 31/00* (2006.01)
(58) Field of Classification Search
  CPC ...... B65D 2543/00842; B65D 43/0231; B29C 45/14467; B29K 2025/06; B29L 2031/712
  See application file for complete search history.

(56) References Cited

U.S. PATENT DOCUMENTS

| | | | |
|---|---|---|---|
| 7,604,764 | B2 | 10/2009 | Arai et al. |
| 7,975,868 | B1* | 7/2011 | Flies ..................... B65D 1/265 220/524 |
| 2002/0125259 | A1* | 9/2002 | Nakamura ............ B29C 49/071 220/657 |
| 2004/0206717 | A1* | 10/2004 | Flies ..................... B65D 25/04 215/6 |
| 2004/0234712 | A1 | 11/2004 | Arai et al. |
| 2004/0262314 | A1* | 12/2004 | Weatherhead .......... B60P 3/226 220/345.1 |

FOREIGN PATENT DOCUMENTS

| | | |
|---|---|---|
| CN | 101172394 A | 5/2008 |
| EP | 0 605 183 A2 | 7/1994 |
| JP | 2-107416 A | 4/1990 |
| JP | 6-246781 A | 9/1994 |
| JP | 7-001744 A | 1/1995 |
| JP | 2002-178538 A | 6/2002 |
| JP | 2004-345242 A | 12/2004 |
| JP | 2007-015280 A | 1/2007 |
| JP | 2010-221676 A | 10/2010 |
| JP | 2012-002342 A | 1/2012 |
| WO | 2019/054195 A1 | 3/2019 |

OTHER PUBLICATIONS

Second Office Action in Chinese Application No. 201880058286.5 (dated Jan. 2022).
First Office Action in Chinese Application No. 201880058286.5 (dated May 2021).
Notice of Reasons for Refusal in Japanese Application No. 2017-175194 (dated Oct. 2021).

* cited by examiner

LIQUID CONTAINER AND MANUFACTURING METHOD OF THE SAME

CROSS-REFERENCE TO RELATED APPLICATIONS

This application is a Continuation of International Patent Application No. PCT/JP2018/032232, filed Aug. 30, 2018, which claims the benefit of Japanese Patent Application No. 2017-175194, filed Sep. 12, 2017, both of which are hereby incorporated by reference herein their entirety.

BACKGROUND OF THE INVENTION

Field of the Invention

The present invention relates to a liquid container including a container portion and a lid bonded with the container portion so as to cover an opening region of the container portion and to a manufacturing method of the liquid container.

Description of the Related Art

Hitherto, there has been known a box-type liquid container made of resin. The liquid container of this sort is often used to store liquid therein in a sealed state for example. The liquid container of this sort is composed of a hollow container portion (body part of the container) partially opened to store liquid and a lid part covering so as to close the opened region of the container portion. These parts of the container portion and the lid are manufactured respectively separately by means of injection molding of thermoplastic resin for example.

Some of such liquid containers is also configured such that an inside of the liquid container is separated into a plurality of storage tanks by diaphragms (partition ribs) to reserve a plurality of liquids having different characteristics such as different types and colors into the respective storage tanks. A method of bonding the injection molded resin-made lid with the diaphragms of the container by means of ultrasonic welding has been proposed in order to seal the respective tanks while securely separating the tanks in such configuration (see the following Patent Literature 1).

In the prior art liquid container as described above, the container and the lid obtained respectively by injection molding are bonded by means of ultrasonic welding, which is a separate process. Due to that, after taking the container and the lid out of molds, a plurality of processes such as moving the container and the lid to an assembly line (possibly processes such as packing, transporting and unpacking them are also necessary depending on a case) and setting them to a jig for ultrasonic welding are necessary, which may be costly.

CITATION LIST

Patent Literature

Patent Literature 1 Japanese Patent Application Laid-open No. 2007-015280

SUMMARY OF THE INVENTION

According to a first aspect of the present invention, a liquid container includes a container portion including a plurality of storage portions separated by at least one partition rib and storing liquid respectively in an isolated state, a lid bonded with the container portion so as to cover an opening region of the container portion, a plurality of project portions integrally molded with the lid and engaging with the partition rib so as to sandwich the partition rib from both sides of the partition rib, and a bonding portion filled with bonding resin so as to seal between an edge end of the partition rib and the lid and between an edge end of an outer circumference of the container portion and the lid.

According to a second aspect of the present invention, a manufacturing method of a liquid container, including a first molding step of molding a container portion comprising a plurality of storage portions separated by at least one partition rib and storing liquids respectively in an isolated state, a second molding step of molding a lid including a plurality of project portions configured to engage with the partition rib so as to sandwich the partition rib from both sides of the partition rib and to be bondable with the container portion so as to cover an opening region of the container portion, and an insert molding step of setting the container portion and the lid molded in the first and second molding steps in insert molds and of filling a bonding portion with bonding resin so as to seal a cavity between an edge end of the partition rib and the lid, and a cavity between an edge end of an outer circumference of the container portion and the lid.

Further features of the present invention will become apparent from the following description of exemplary embodiments with reference to the attached drawings.

DESCRIPTION OF THE EMBODIMENTS

Modes for carrying out the invention will be described below with reference to the attached drawings. Note that a configuration illustrated below is just one example and a person skilled in the art may appropriately modify detailed structures for example within a scope not departing from a gist of the invention. Still further, numerical values adopted in the embodiments are reference numerical values and do not limit the invention.

In the embodiments described below, a bonding method which replaces ultrasonic welding and which comprises steps of inserting a container and a lid again into molds after taking out the container and the lid molded by injection molding and of injecting bonding resin between the both components to bond the both components is illustrated. This method possibly enables to cut such process as transportation and to realize cost reduction.

In the method of bonding the container and the lid by the insert molding of the bonding resin, the container and the lid which are in a high temperature state after being taking out respectively from the molds for injection molding are inserted into different molds for insert molding which is in a cooled state. If an efficiency of a manufacturing process is taken into consideration in particular, it is preferable to insert the container and the lid immediately to the insert molds after drawing from the molds for injection molding. In such a case, they are inserted into the molds for insert molding such that the container is inserted into a movable mold and the lid is inserted into a stationary mold respectively for example. At this time, the container and the lid come into contact with the molds for insert molding, are cooled and cause volumetric shrinkage. Thus, there is a possibility of generating gaps between the movable mold and the container and between the stationary mold and the lid and of causing a divergence between relative positions of each part of bonding regions of the container and of the lid.

In the insert molding, the movable mold and the stationary mold are clamped, bonding surfaces of the container and the lid are butted with each other to form a bonding portion and resin is injected from a gate to the bonding portion. If the relative position of the container and the lid is divergent at this time, there is a possibility that the bonding surface is reduced and the bonding resin overflows into a storage tank within the container or flows out of the container. Thus, the bonding may become incomplete. As a result, sealability of the whole liquid container or between the storage tanks becomes incomplete and thus there is a possibility of causing such problems that the liquid leaks outside and the liquids within the neighboring storage tanks, which ought not to be originally mixed, are mixed unintentionally. Configurations of the following embodiments are considered to avoid such problems.

First Embodiment

Figure 1A:
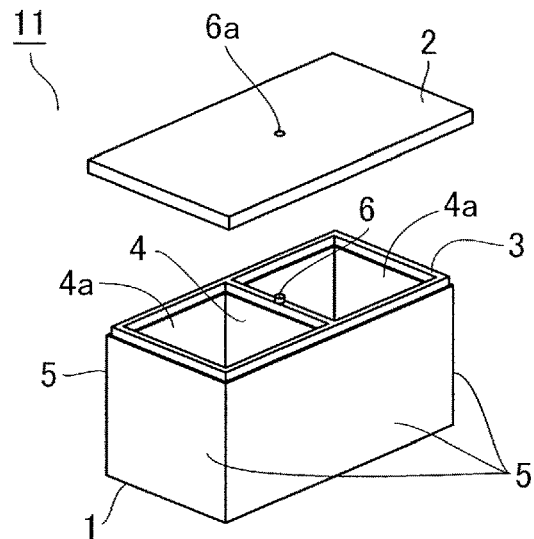
FIG. 1A is a perspective view illustrating a liquid container of a first embodiment of the invention.
Figure 1B:
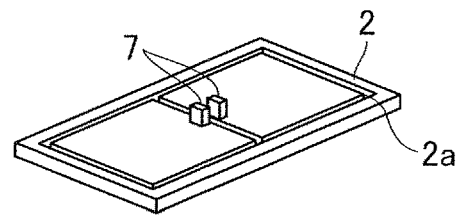
FIG. 1B is a perspective view illustrating the liquid container of the first embodiment of the invention.
Figure 1C:
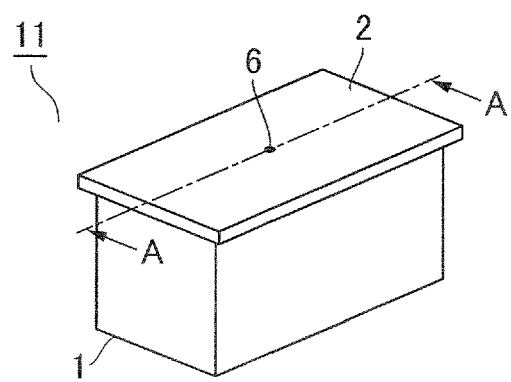
FIG. 1C is a perspective view illustrating the liquid container of the first embodiment of the invention.

FIGS. 1A through 1C illustrate a structure of a box type liquid container 11 of a first embodiment of the invention. As illustrated in FIGS. 1A through 1C, the liquid container 11 is composed of a container portion 1, a lid 2 and a bonding resin 3 that bonds the container portion 1 with the lid 2.

The box type container portion 1 defined by an outer circumferential wall 5 and a bottom portion of which detail is not illustrated includes storage portions 4a (storage tanks) which are separated by partition rib 4 and in which liquids are stored respectively in an isolated state. The partition rib 4 is disposed approximately at center in a longitudinal direction of the container portion 1 as illustrated in the drawings. In this case, the container portion 1 is separated into the two storage portions 4a and 4a by one partition rib 4.

The container portion 1 is formed into a box in which an upper part thereof as illustrated in the drawing is opened and a lid 2 is to be bonded with the container portion 1 by the bonding resin 3 so as to cover the opened region of the container portion 1. The container portion 1 and the lid 2 formed respectively by injection molding of resin materials are mounted to an insert mold and in this state, the bonding resin 3 is filled between the container portion 1 and the lid 2.

FIG. 1A illustrates a decomposed state in which a part between the bonding resin 3 and the lid 2 is separated after filling the bonding resin 3 to illustrate a shape of the bonding resin 3. In this example, a cavity 2a for filling the bonding resin 3 is formed as a groove communicating in a shape like letter B on a back-surface side of the lid 2 facing the container portion 1 as illustrated in FIG. 1B. The shape of the cavity 2a is defined such that the filled bonding resin 3 seals between an edge end of a top of the partition rib 4 and the lib 2 and between an edge end of a top of the outer circumferential wall 5 of the storage portions 4a and 4a and the lid 2. As illustrated in FIG. 1A, a gate hole 6a communicating with the cavity 2a is opened through the lid 2, and a region of the gate 6 of the bonding resin 3 penetrating through the lid 2 in a columnar shape is formed by filling the gate hole 6a by the bonding resin 3 (FIG. 1C).

In this example, project portions 7 and 7 positioning the container portion 1, the lid 2 and the partition rib 4 are also integrally molded with the lid 2 in a state in which the container portion 1 and the lid 2 are mutually positioned at a predetermined bonding position, e.g., in a state in which the container portion 1 and the lid 2 are mounted in the insert molds and the molds are clamped. That is, as illustrated in FIG. 1B, the plurality of project portions 7 and 7 that engage with the partition rib 4 are integrally molded with the lid 2 so as to sandwich the partition rib 4 from both sides thereof at the bonding positions of the container portion 1 and 2.

The container portion 1 is configured so as to be able to be covered by the lid 2, and the bonding resin 3 is present at an end portion of the partition rib 4 of the container portion 1 and at an end portion of the outer circumferential wall 5 of the container portion 1. The bonding resin 3 penetrates through the lid 2 in a columnar shape approximately at center of the partition rib 4 and is connected with the gate 6 which is an inflow port of the bonding resin 3.

FIG. 1C illustrates the liquid container 11 in which the container portion 1 is integrated with the lid 2 by the bonding resin 3. In this state, the container portion 1 and the lid 2 are bonded with each other and are integrated by the bonding resin 3 injected from the gate 6 as described above.

Figure 2:
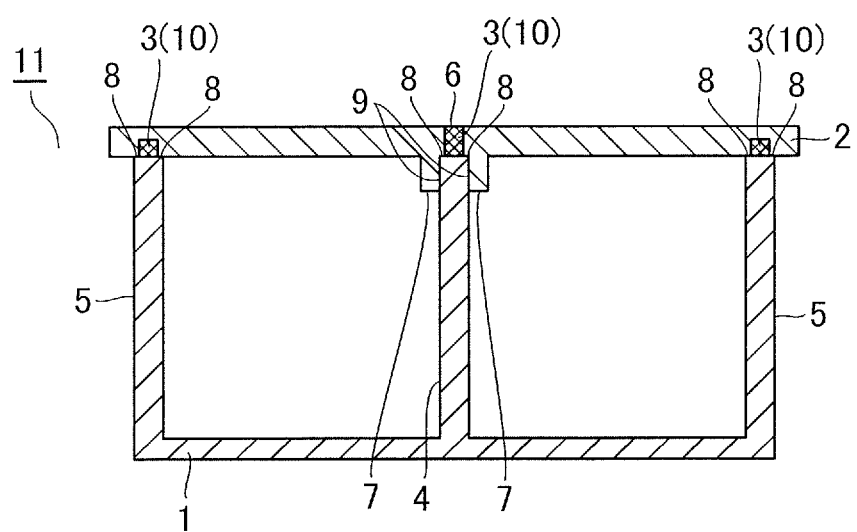
FIG. 2 is a section view taken along a line A-A of FIG. 1C.

FIG. 2 is a section view corresponding to a section A-A indicated by arrows in FIG. 1C. As illustrated in FIG. 2, the project portions 7 provided on the lid 2 define an engage portion 9 with predetermined engagement so as to sandwich the partition rib 4 provided in the container portion 1. The outer circumferential wall 5 and the partition rib 4 of the container portion 1 and lid 2 form a bonding portion 10 having an approximately same shape with the bonding resin 3 by butting their bonding surfaces 8 with each other. Then, the bonding resin 3 is formed also at end portions of the outer circumferential wall 5 and the partition rib 4 by injecting the bonding resin 3 to the bonding portion 10 from the gate 6.

Figure 3A:
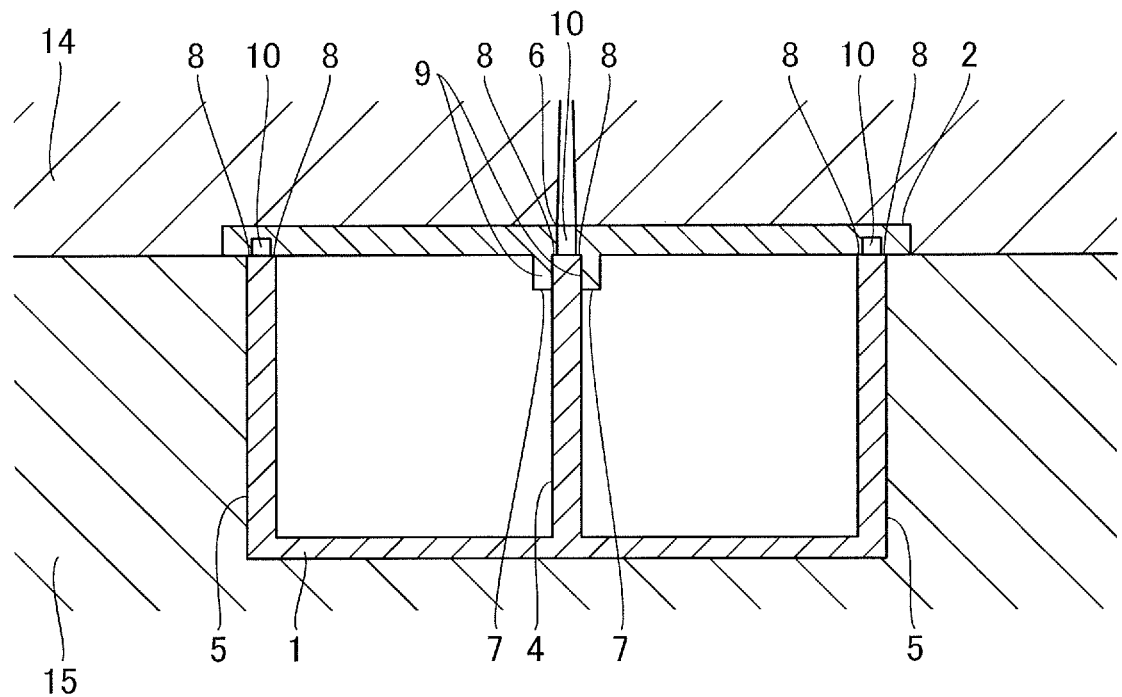
FIG. 3A is a section view illustrating a manufacturing step of the liquid container of the first embodiment of the invention.
Figure 3B:
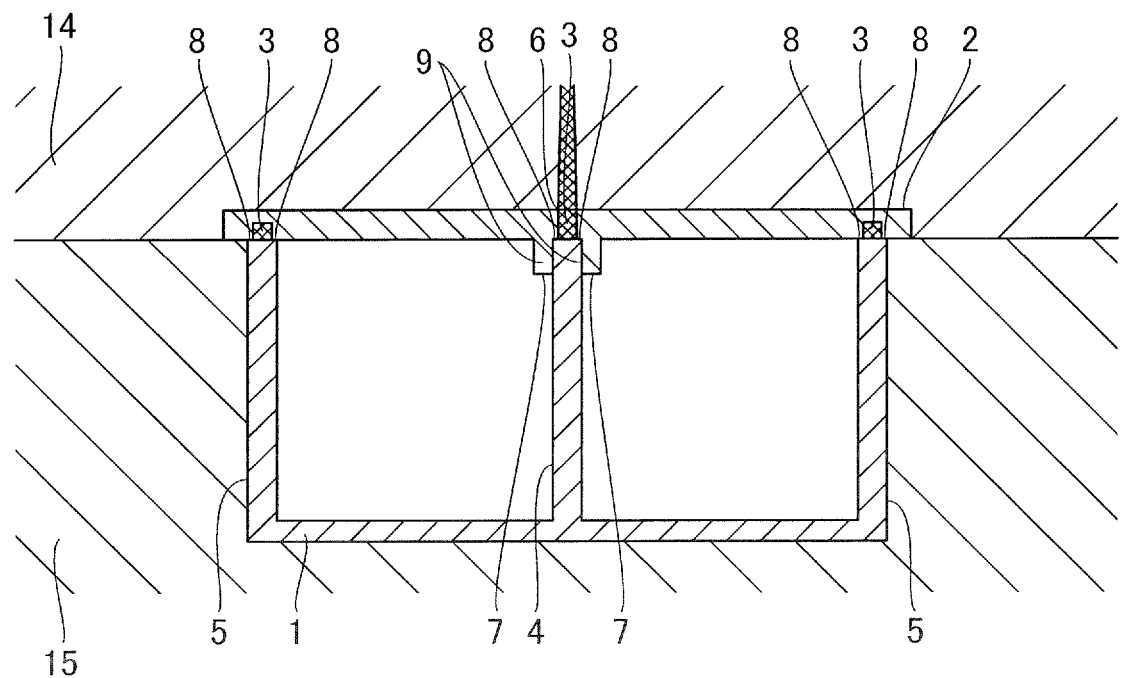
FIG. 3B is a section view illustrating a manufacturing step of the liquid container of the first embodiment of the invention.
Figure 10:
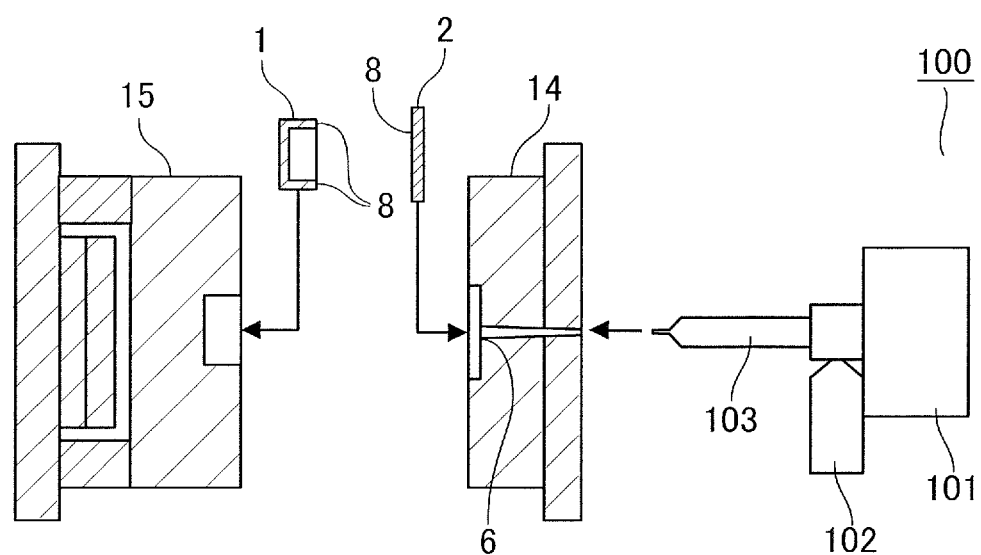
FIG. 10 illustrates a schematic configuration of a manufacturing device that bonds the lid and the container portion of the liquid container by means of insert molding.

FIG. 10 illustrates a structural example of an injection molding machine 100 provided with molds (stationary mold 14 and movable mold 15) for insert molding used for bonding the lid 2 with the container portion 1. In addition to the stationary mold 14 and the movable mold 15, the injection molding machine 100 includes an injection machine 101, a hopper 102 for setting and supplying a material of the bonding resin and a nozzle 103 for injecting bonding molten resin within the hopper 102 out of a tip by pressure from the injection machine 101. The nozzle 103 is connected with a gate hole of the stationary mold 14 in performing the injection molding. FIGS. 3A and 3B illustrate filling states of the bonding resin 3 performed by mounting the lid 2 and the container portion 1 to the insert molds (stationary mold 14 and movable mold 15). FIG. 3A illustrates a state before injecting the bonding resin 3 and FIG. 3B illustrates a state after injecting the bonding resin 3, respectively.

Note that while FIG. 10 illustrates a configuration in which the lid 2 and the container portion 1 are inserted into the molds for bonding them, the configuration may be modified such that the container portion 1 is inserted into the mold used for molding the lid 2 and such that the lid 2 is inserted into the mold used for molding the container portion 1.

According to the present embodiment, the lid 2 is mounted to the stationary mold 14 provided with a resin injection path at a position corresponding to the gate hole 6a for example and the container portion 1 is mounted to the movable mold 15. After when the bonding resin 3 is filled and the lid 2 is bonded with the container portion 1 as illustrated in FIG. 3B, the movable mold 15 is opened and the bonded lid 2 and the container portion 1 are released from the stationary mold 14 for example by means of a releasing pin not illustrated.

According to the present embodiment, the engagement of the engage portion 9, e.g., a total amount of distances between the project portions 7 and 7 and the partition rib 4, is set to be equal to or less than 0.05 mm. This engaging dimension can be controlled by positions where the project portions 7 and 7 are formed for example. Accuracy of mutual bonding positions (posture) of the lid 2 and the container portion 1 is kept by reducing the engagement of the engage portion 9 to be small as equal to or less than 0.05 mm. Because the project portions 7 and 7 of the lid 2 are disposed on the both sides of the partition rib 4 so as to configure the engaging dimension as described above in particular, the accuracy of the mutual bonding positions (posture) of the edge end at the top of the partition rib 4 and the cavities 2a of the lid 2 is guaranteed. Accordingly, it is possible to avoid such problems that the bonding resin 3 leaks out of the storage portions 4a and 4a of the container portion 1 or that the bonding resin 3 is not fully filled, thus causing that the storage portions 4a and 4a unintentionally communicates with each other. Still further, because the accuracy of the mutual bonding positions (postures) of the lid 2 and the container portion 1 is kept, the bonding resin 3 will not leak out of the container portion 1 in the same manner. Thus, the container portion 1 and the lid 2 are bonded in a state in which the two storage portions 4a and 4a of the container portion 1 are securely separated in a liquid-tight state.

After that, two types of liquids are injected separately to the two storage portions 4a and 4a of the container portion 1 by an adequate method to complete the liquid container 11. It is possible to dispose appropriate injection holes or valves (none are illustrated) for example at part of the lid 2 and the outer circumferential wall 5 of the container portion 1 to inject the liquids. Because the container portion 1 and the lid 2 are tightly closed in the state in which the two storage portions 4a and 4a are separated as described above, the two types of the liquids will not be mixed.

Figure 11:
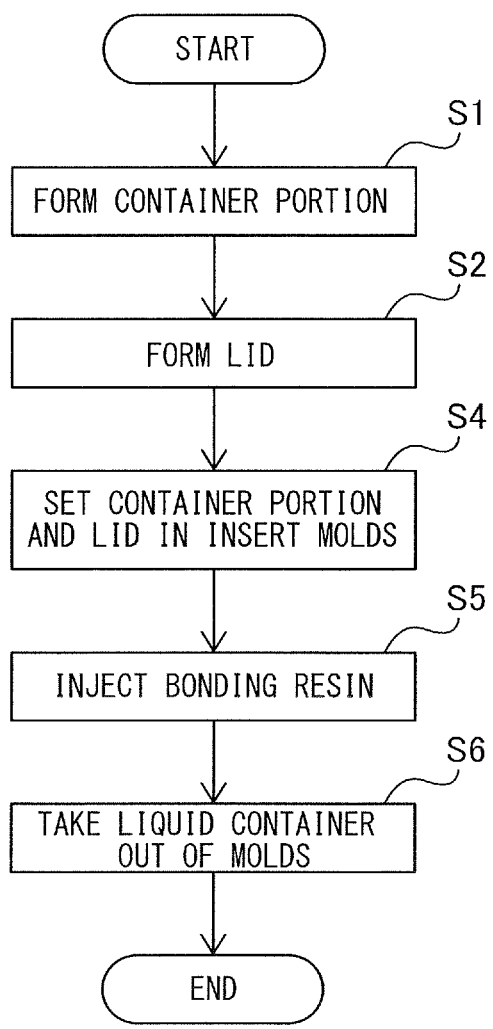
FIG. 11 is a flowchart illustrating manufacturing processes of the liquid container of the respective embodiments of the invention.

Here, FIG. 11 illustrates one example of a flow of a manufacturing process of the liquid container 11. In the manufacturing process illustrated in FIG. 11, the container portion 1 including the plurality of storage portions 4a separated by the partition rib 4 and for respectively storing liquids in an isolated state is molded in Step S1 (first molding step).

In succession, the lid 2 is molded in Step S2 (second molding step). The lid 2 includes the plurality of project portions 7 and 7 that engageable with the partition rib 4 so as to sandwich from the both sides thereof and can be bonded so as to cover the opening region of the container portion 1. Note that although the step of molding the container portion 1 is the first molding step and the step of molding the lid 2 is the second step in FIG. 11, the step of molding the lid 2 may be a first molding step and the step of molding the container portion 1 may be a second molding step. The container portion 1 and the lid 2 may be also molded in the same time.

Next, the container portion 1 and the lid 2 molded in the Steps S1 and S2 (in the first and second molding steps) are set in the insert moldings (the stationary mold 14 and the movable mold 15) in Step S4. Then, the bonding resin 3 is filled such that the cavities 2a between the edge end of the partition rib and the lid and between the edge end of the outer circumference of the storage portion and the lid are sealed in a state in which the partition rib 4 engages with the project portions 7 and 7 in Step S5 (insert molding step). After that, the liquid container 11 composed of the container portion 1 and the lid 2 bonded as described above is taken out of the insert molds (the stationary mold 14 and the movable mold 15) in Step S6.

The structure of the liquid container 11 for which the invention has been adopted and the basic configuration of the manufacturing method thereof have been described above. Second through fourth embodiments concerning a liquid container 11 having a different structure around a partition rib 4 and project portions 7 from the first embodiment will be illustrated below. After that, more specific first and second samples of the liquid containers 11 respectively embodying the configurations of the first and the fourth embodiments will be illustrated. In the following description, the same or corresponding components will be denoted by the same reference signs and an overlapped description thereof will be omitted unless specifically required.

Second Embodiment

Figure 4A:
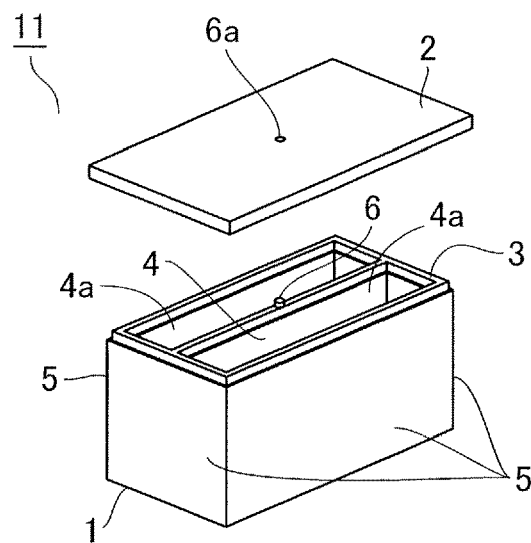
FIG. 4A is a perspective view illustrating a liquid container of a second embodiment of the invention.
Figure 4B:
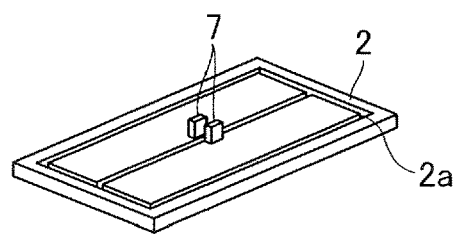
FIG. 4B is a perspective view illustrating the liquid container of the second embodiment of the invention.
Figure 4C:
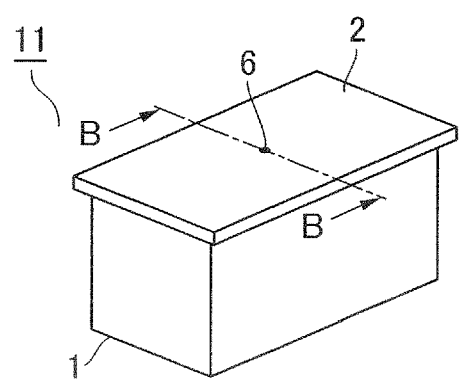
FIG. 4C is a perspective view illustrating the liquid container of the second embodiment of the invention.

FIGS. 4A through 4C and FIG. 5 illustrate a structure of a liquid container 11 of a second embodiment. FIGS. 4A through 4C correspond to FIGS. 1A through 1C of the first embodiment and FIG. 5 corresponds to FIG. 2 in the same manner.

As illustrated in FIG. 4A, the container portion 1 of the second embodiment includes one partition rib 4 disposed approximately at center in a short direction of the liquid container 11, and an inside of the container portion 1 is separated by the partition rib 4 into two storage portions 4a and 4a (storage tanks) that extend in the longitudinal direction of the container. While shapes of the bonding resin 3 in FIG. 4A and of the cavity 2a on a back of the lid 2 in FIG. 4B are the same with the first embodiment in terms of a part of the outer circumferential wall 5, the bonding resin 3 is formed so as to seal an edge end at a top of the partition rib 4. A position of the gate hole 6a is located approximately at the same position with that of the first embodiment so as to be able to inject the bonding resin 3 into the cavity 2a from a center position of the partition rib 4.

Still further, a plurality of project portions 7 and 7 that is engageable with the partition rib 4 so as to sandwich the partition rib 4 from the both sides thereof is integrally formed with the lid 2 as illustrated in FIG. 4B. The project portions 7 and 7 are integrally molded with the lid 2 with posture different approximately by 90 degrees from what illustrated in FIG. 1B in the present embodiment as a matter of course.

Figure 5:
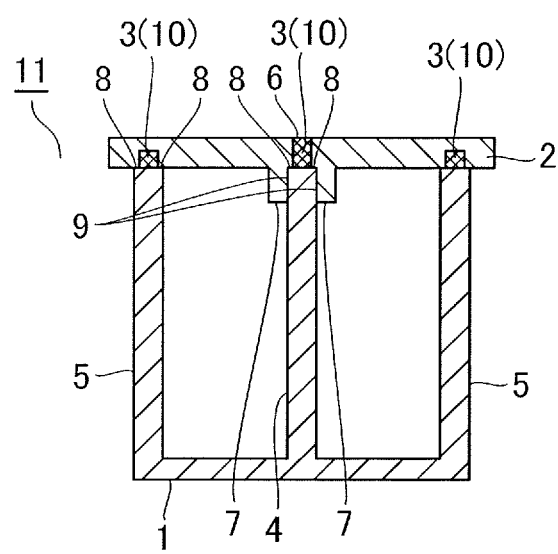
FIG. 5 is a section view taken along a line B-B of FIG. 4C.

FIG. 4C illustrates a state after when the container portion 1 is integrated with the lid 2 by the bonding resin 3. In FIG. 4C, the container portion 1 and the lid 2 are bonded and integrated with each other by the bonding resin 3 injected from the gate 6. FIG. 5 is a section view corresponding to a section B-B indicated by arrows in FIG. 4C, and the project portions 7 provided on the lid 2 form an engage portion 9 with a predetermined engagement so as to sandwich the partition rib 4 provided in the container portion 1. The outer circumferential wall 5 and the partition rib 4 of the container portion 1 and the lid 2 form a bonding portion 10 having approximately the same shape with the bonding resin 3 by butting their bonding surfaces 8 with each other. The bonding resin 3 is formed at an end portion of the outer circumferential wall 5 and also at an end portion of the partition rib 4 by injecting the bonding resin 3 from the gate 6 to the bonding portion 10. At this time, the engagement of the engage portion 9 is set to be equal to or less than 0.05 mm in the same manner with the first embodiment. Therefore, the bonding resin 3 will not overflow inside and outside of the container portion 1. Still further, the bonding resin 3 will not flow out of the container portion 1 in the same manner. Thus, the container portion 1 is bonded with the lid 2 in a state in which the two storage portions 4a and 4a are separated in a liquid-tight state.

After that, two types of liquids are separately injected into the two storage portions 4a and 4a of the container portion 1 by an adequate method to complete the liquid container 11. Because the container portion 1 and the lid 2 are sealed in the state in which the two storage portions 4a and 4a are separated as described above, the two types of the liquids stored respectively in the storage portions will not be mixed unintentionally.

Third Embodiment

Figure 6A:
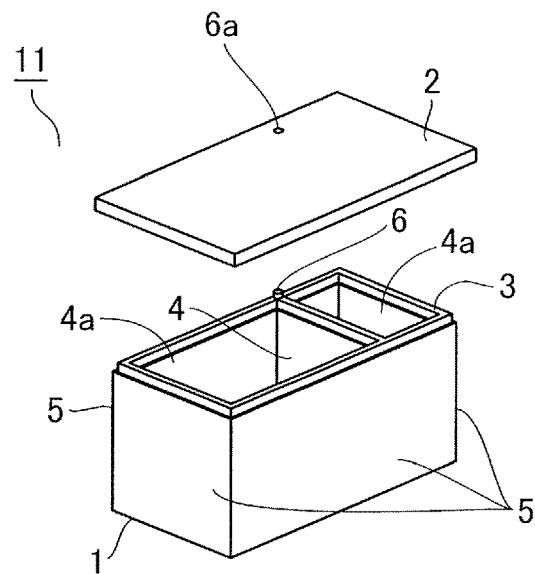
FIG. 6A is a perspective view illustrating a liquid container of a third embodiment of the invention.
Figure 6B:
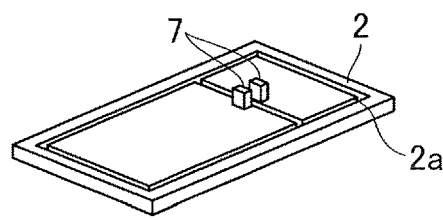
FIG. 6B is a perspective view illustrating the liquid container of the third embodiment of the invention.
Figure 6C:
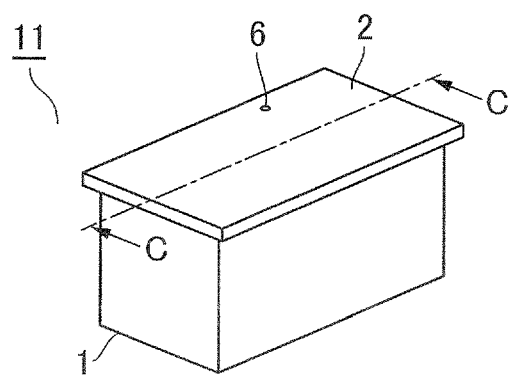
FIG. 6C is a perspective view illustrating the liquid container of the third embodiment of the invention.

FIGS. 6A through 6C and FIG. 7 illustrate a structure of a liquid container 11 of a third embodiment. FIGS. 6A through 6C correspond to FIGS. 1A through 1C of the first embodiment and FIG. 7 corresponds to FIG. 2 in the same manner.

As illustrated in FIG. 6A, the container portion 1 of the third embodiment includes one partition rib 4 disposed at a position closer to one side in the longitudinal direction of the liquid container 11 by about ⅓, and an inside of the container portion 1 is separated by the partition rib 4 into two storage portions 4a and 4a (storage tanks) each having different storage capacity. While shapes of the bonding resin 3 in FIG. 6A and of the cavity 2a on a back of the lid 2 in FIG. 6B are the same with those of the first and second embodiments in terms of the part of the outer circumferential wall 5, they are formed so as to seal an edge end at a top of the partition rib 4 located at a different position. A position of a gate hole 6a is located not at center of the partition rib 4 but at a position closer to the one side of the outer circumferential wall 5 so as to be able to inject the bonding resin 3 into the cavity 2a through the gate hole 6a.

Still further, a plurality of project portions 7 and 7 that is engageable with the partition rib 4 so as to sandwich the partition rib 4 from the both sides thereof is integrally formed with the lid 2 as illustrated in FIG. 6B. The project portions 7 and 7 are disposed at a position corresponding to the partition rib 4, differing from what illustrated in FIG. 1B.

Figure 7:
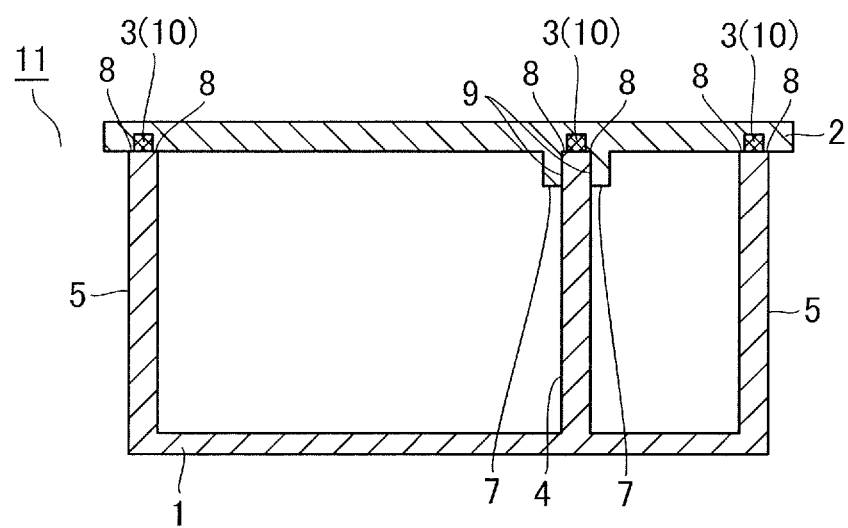
FIG. 7 is a section view taken along a line C-C of FIG. 6C.

FIG. 6C illustrates a state after when the container portion 1 is integrated with the lid 2 by the bonding resin 3. In FIG. 6C, the container portion 1 and the lid 2 are bonded and integrated with each other by the bonding resin 3 injected from the gate 6. FIG. 7 is a section view corresponding to a section C-C indicated by arrows in FIG. 6C, and the project portions 7 provided on the lid 2 form an engage portion 9 with a predetermined engagement so as to sandwich the partition rib 4 provided in the container portion 1. The outer circumferential wall 5 and the partition rib 4 of the container portion 1 and the lid 2 form a bonding portion 10 having approximately the same shape with the bonding resin 3 by butting bonding surfaces 8 with each other. The bonding resin 3 is formed at an end portion of the outer circumferential wall 5 and also at an end portion of the partition rib 4 by injecting the bonding resin 3 from the gate 6 to the bonding portion 10. At this time, an engagement of the engage portion 9 is set to be equal to or less than 0.05 mm in the same manner with the first and second embodiments. Therefore, the bonding resin 3 will not outflow inside and outside of the container portion 1. Still further, the bonding resin 3 will not flow out of the container portion 1 in the same manner. Thus, the container portion 1 is bonded with the lid 2 in a state in which the two storage portions 4a and 4a are separated in a liquid-tight state.

After that, two types of liquids are separately injected into the two storage portions 4a and 4a of the container portion 1 by an adequate method to complete the liquid container 11. Because the container portion 1 and the lid 2 are sealed in the state in which the two storage portions 4a and 4a are separated as described above, the two types of the liquids stored respectively in the storage portions will not be mixed unintentionally.

Fourth Embodiment

Figure 8A:
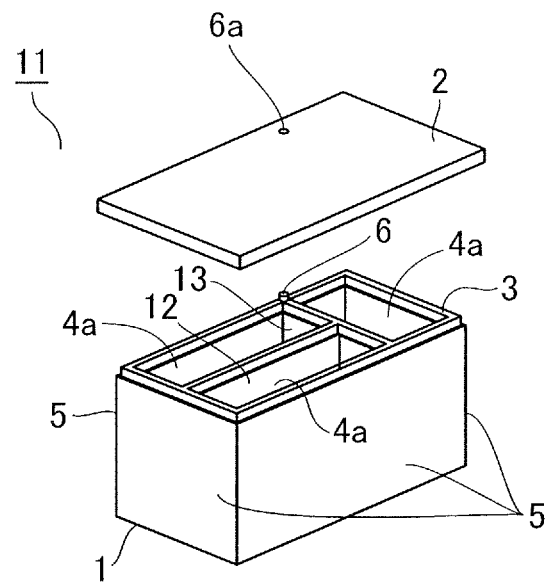
FIG. 8A is a perspective view illustrating a liquid container of a fourth embodiment of the invention.
Figure 8B:
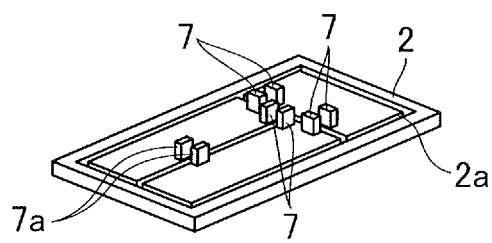
FIG. 8B is a perspective view illustrating the liquid container of the fourth embodiment of the invention.
Figure 8C:
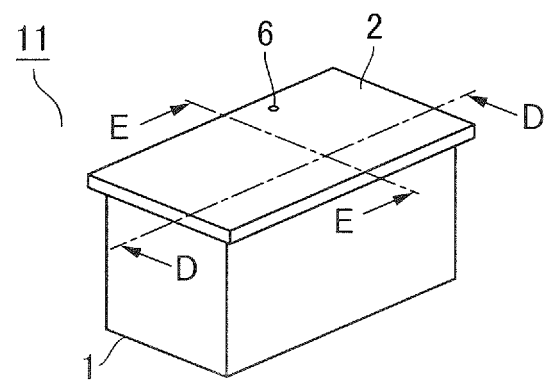
FIG. 8C is a perspective view illustrating the liquid container of the fourth embodiment of the invention.

FIGS. 8A through 8C and FIGS. 9A and 9B illustrate a structure of a liquid container 11 of a fourth embodiment. FIGS. 8A through 8C correspond to FIGS. 1A through 1C of the first embodiment. Still further, while FIGS. 9A and 9B correspond to FIG. 2 of the first embodiment, they illustrate two different sections of the liquid container 11, respectively.

As illustrated in FIG. 8A, the container portion 1 of the fourth embodiment includes a first partition rib 12 disposed approximately at center in a short direction and a second partition rib 13 disposed at a position approximately ⅓ of the longitudinal direction, respectively. The partition ribs 12 and 13 intersect in a shape of a letter T, and the container portion 1 is separated into three storage portions 4a, 4a and 4a (storage tanks) by these partition ribs 12 and 13.

Shapes of the bonding resin 3 in FIG. 8A and of a cavity 2a on a back of the lid 2 in FIG. 8B are the same with those of the first and second embodiments in terms of a part of the outer circumferential wall 5, the bonding resin 3 is formed into the letter of T at parts of the partition ribs 12 and 13 which are located at different positions so as to seal an edge end above that. A gate hole 6a is positioned at a position closer to one side of the outer circumferential wall 5 of the partition rib 13 to be able to inject the bonding resin 3 into the cavity 2a through the gate hole 6a.

Still further, three pairs of project portions 7, 7 and 7 . . . engageable with the partition ribs 12 and 13 so as to sandwich the partition ribs 12 and 13 from both sides thereof are integrally formed with the lid 2 as illustrated in FIG. 8B. One pair of the project portions 7 is disposed in a vicinity of a position where the partition rib 12 intersects with the partition rib 13 so as to sandwich the partition rib 12. The other two pairs of project portions 7 are disposed on both sides where the partition rib 13 intersects with the partition rib 12 so as to sandwich the partition rib 13. Note that another pair of project portions 7a and 7a engaging so as to sandwich the partition rib 12 may be disposed in a vicinity or the like of the position where the partition rib 12 intersects with the outer circumferential wall 5 as illustrated in FIG. 8B (and FIG. 9A).

FIG. 8C illustrates a state after when the container portion 1 and the lid 2 are integrated by the bonding resin 3. In FIG. 8C, the container portion 1 and the lid 2 are integrated with each other by the bonding resin 3 injected from the gate 6.

Figure 9A:
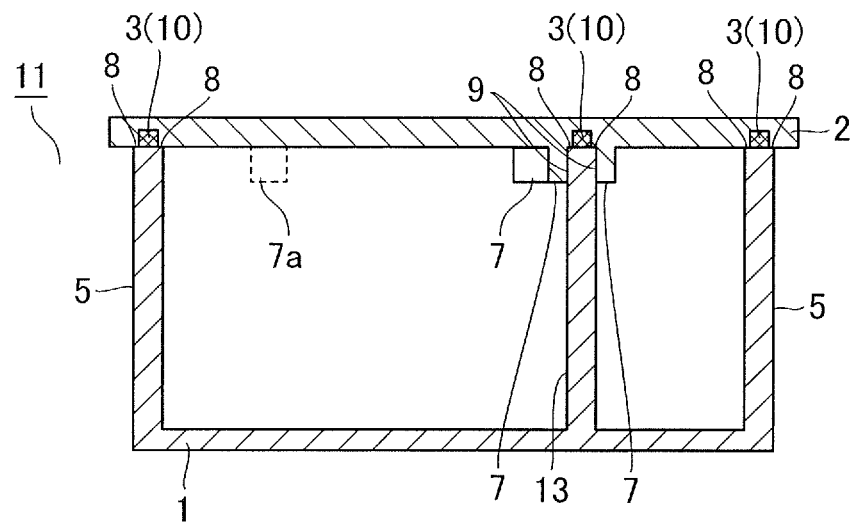
FIG. 9A is a section view taken along a line D-D of FIG. 8C.
Figure 9B:
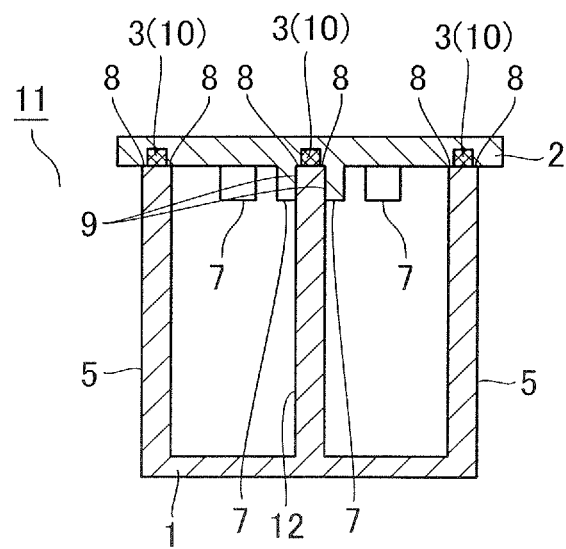
FIG. 9B is a section view taken along a line E-E of FIG. 8C.

FIG. 9A illustrates a section view taken along a section D-D indicated by arrows in FIG. 8C, and FIG. 9B illustrates a section view taken along a section E-E indicated by arrows in FIG. 8C.

As illustrated in FIGS. 9A and 8B, the two pairs of project portions 7 and 7 on the lid 2 form engage portions 9 with a predetermined engagement so as to sandwich the partition rib 13 provided on the container portion 1. A bonding portion 10 having approximately the same shape with the bonding resin 3 is formed by butting bonding surfaces 8 of the outer circumferential wall 5 and the second partition rib 13 of the container portion 1 and the lid 2 with each other.

Still further, as illustrated in FIG. 9B, a pair of project portions 7 of the lid 2 (or another pair of project portions 7a illustrated by a broken line in FIG. 9A) forms an engage portion 9 with a predetermine engagement so as to sandwich the first partition rib 12 of the container portion 1. A bonding portion 10 having approximately the same shape with the bonding resin 3 is formed by butting bonding surfaces 8 of the outer circumferential wall 5 and the second partition rib 12 of the container portion 1 and the lid 2 with each other.

In FIGS. 9A and 9B, the bonding resin 3 is formed at an end portion of the outer circumferential wall 5 and at end portions of the partition rib 12 and the partition rib 13 by injecting the bonding resin 3 to the bonding portion 10 from the gate 6. At this time, the engagement of the engage portion 9 is set to be equal to or less than 0.05 mm in the same manner with the first through third embodiments. Therefore, the bonding resin 3 will not outflow inside and outside of the container portion 1. Still further, the bonding resin 3 will not flow out of the container portion 1 in the same manner. Thus, the container portion 1 is bonded with the lid 2 in a state in which the three storage portions 4a, 4a and 4a are separated in a liquid-tight state.

After that, three types of liquids are separately injected into the three storage portions 4a, 4a, and 4a of the container portion 1 by an adequate method to complete the liquid container 11. Because the container portion 1 and the lid 2 are sealed in the state in which the three storage portions 4a, 4a, and 4a are separated as described above, the three types of the liquids stored in the respective storage portions will not be mixed unintentionally.

First and second examples will be described below as more specific exemplary configurations of the first and fourth embodiments described above.

Example 1

The present example relates to the liquid container 11 of the first embodiment, i.e., the liquid container 11 illustrated in FIGS. 1A through 1C and FIG. 2. Impact resistant polystyrene was used in the present example as a material used for the injection molding of the container portion 1, the lid 2 and the bonding resin 3. A finished product of the liquid container 11 was obtained after injecting the bonding resin 3 from the gate 6 in a state in which the container portion 1 butts with the lid 2 at a predetermined position and by injecting two different types of liquids into the two storage portions 4a and 4a.

At this time, as indicated on a left side of Table 1, a plurality of liquid containers 11 in which positions of the project portions 7 and 7 (or a thickness of the partition rib 4) are differentiated for example such that engagements (a total amount of gaps between the partition rib 4 and the project portions 7 and 7) of the engage portion 9 are differentiated was manufactured. Then, it was evaluated whether the bonding resin has overflowed (center in Table 1) and whether the liquids have been mixed (right side in Table 1) per dimension of each engagement (total amount of gaps between the partition rib 4 and the project portions 7 and 7).

TABLE 1

| ENGAGEMENT OF ENGAGE PORTION [mm] | OVERFLOW OF BONDING RESIN | MIXTURE OF LIQUIDS |
| --- | --- | --- |
| −0.02 | A | A |
| −0.01 | A | A |
| 0 | A | A |
| 0.01 | A | A |
| 0.02 | A | A |
| 0.03 | A | A |
| 0.04 | A | A |
| 0.05 | A | A |
| 0.06 | B | A |
| 0.07 | B | A |
| 0.08 | B | B |
| 0.09 | B | B |
| 0.1 | B | B |

In Table 1, those what have not caused the overflow of the resin into the inside of the container portion 1 were denoted by a symbolic character of A and those what have caused the overflow of the resin were denoted by B (center in Table 1). In the same manner, those what have not caused the mixture of the two liquids were denoted by a symbolic character of A and those what have caused the mixture of the liquids was denoted by B (on the right side in Table 1). As indicated in Table 1, it can be seen that none of the overflow of the bonding resin and the mixture of the liquids has occurred under the condition in which the engagement of the engage portion 9 is equal to or less than 0.05 mm.

Example 2

The present example relates to the liquid container 11 of the fourth embodiment, i.e., the liquid container 11 illustrated in FIGS. 8A through 8C and FIGS. 9A and 9B. Impact resistant polystyrene was used in the present example as a material used for the injection molding of the container portion 1, the lid 2 and the bonding resin 3. The liquid container 11 was obtained after injecting the bonding resin 3 from the gate 6 in a state in which the container portion 1 butts with the lid 2 and by injecting three different types of liquids separately into the three storage portions 4a, 4a and 4a.

At this time, as indicated on a left side of Table 2, a plurality of liquid containers 11 in which positions of the project portions 7 and 7 (or a thickness of the partition rib 4) are differentiated for example such that engagements (a total amount of gaps between the partition rib 4 and the project portions 7 and 7) of the respective engage portions 9 are differentiated was manufactured. Then, it was evaluated whether the bonding resin has overflowed (center in Table 2) and whether the liquids have been mixed (right side in Table 2) per dimension of each engagement (total amount of gaps between the partition rib 4 and the project portions 7 and 7).

TABLE 2

| ENGAGEMENT OF ENGAGE PORTION [mm] | OVERFLOW OF BONDING RESIN | MIXTURE OF LIQUIDS |
| --- | --- | --- |
| −0.02 | A | A |
| −0.01 | A | A |
| 0 | A | A |
| 0.01 | A | A |
| 0.02 | A | A |
| 0.03 | A | A |
| 0.04 | A | A |
| 0.05 | A | A |
| 0.06 | B | A |
| 0.07 | B | A |
| 0.08 | B | B |
| 0.09 | B | B |
| 0.1 | B | B |

In Table 2, those what have not caused the overflow of the resin into the inside of the container portion 1 were denoted by a symbolic character of A and those what have caused the overflow of the resin were denoted by B (center in Table 2). In the same manner, those what have not caused the mixture of the two liquids were denoted by a symbol character of A and those what have caused the mixture of the liquids was denoted by B (on the right side in Table 2). As indicated in Table 2, it can be seen that none of the overflow of the bonding resin and the mixture of the liquids has occurred under the condition in which the engagement of the engage portion 9 is equal to or less than 0.05 mm.

As indicated in the first and second examples described above, it is desirable to set the dimension of the engagement of the engage portion 9 (the total amount of the gap between the partition rib 4 and the project portions 7 and 7) to be equal to or less than 0.05 mm in either one of the liquid containers 11 having the configurations of the first and fourth embodiments.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A liquid container, comprising:
    a container portion comprising a plurality of storage portions separated by at least one partition rib and storing liquid respectively in an isolated state;
    a lid bonded with the container portion so as to cover an opening region of the container portion;
    a plurality of project portions integrally molded with the lid, the plurality of project portions sandwiching the at least one partition rib from both sides of the at least one partition rib; and
    a bonding portion filled with bonding resin so as to seal between an edge end of the at least one partition rib and the lid and between an edge end of an outer circumference of the container portion and the lid.

2. The liquid container according to claim 1, wherein the at least one partition rib comprises a plurality of partition ribs disposed within the container portion and the lid comprises the plurality of the project portions engaging with the plurality of partition ribs so as to sandwich the respective partition ribs from both sides of the partition ribs.

3. The liquid container according to claim 2, wherein the plurality of partition ribs are disposed so as to intersect with each other.

4. A manufacturing method of the liquid container according to claim 1, the method comprising:
    a first molding step of molding the container portion;
    a second molding step of molding the lid; and
    an insert molding step of setting the container portion and the lid molded in the first and second molding steps in insert molds and of filling the bonding portion with the bonding resin so as to seal a cavity between the edge end of the partition rib and the lid, and the cavity between an edge end of an outer circumference of the container portion and the lid.

5. The manufacturing method of the liquid container according to claim 4, wherein the at least one partition rib comprises a plurality of partition ribs disposed within the container portion, and wherein the lid comprises the plurality of the project portions engaging with the plurality of partition ribs so as to sandwich the respective partition ribs from both sides of the partition ribs.

6. The manufacturing method of the liquid container according to claim 5, wherein the plurality of partition ribs is disposed so as to intersect with each other.

7. The liquid container according to claim 1, wherein the lid has a cavity for filling the bonding resin between the edge end of the outer circumference and the lid.

8. The liquid container according to claim 7, wherein a width of the cavity is smaller than a width of the edge end of the outer circumference.

9. The liquid container according to claim 1, wherein the container portion is configured to store liquid.

10. The liquid container according to claim 1, wherein the lid has a cavity for filling the bonding resin between the partition rib and the lid.

11. A liquid container, comprising:
    a container portion comprising a plurality of storage portions separated by at least one partition rib and storing liquid respectively in an isolated state;
    a lid bonded with the container portion so as to cover an opening region of the container portion; and a bonding portion filled with bonding resin so as to seal between the at least one partition rib and the lid,
wherein the lid has a cavity for filling the bonding resin between the at least one partition rib and the lid, and
wherein a width of the cavity is smaller than a width of the at least one partition rib.

12. The liquid container according to claim 11, wherein the lid has a cavity for filling the bonding resin between an edge end of an outer circumference and the lid.

13. The liquid container according to claim 11, further comprising:
a plurality of project portions integrally molded with the lid, the plurality of project portions sandwiching the at least one partition rib from both sides of the at least one partition rib.

14. The liquid container according to claim 7, wherein the cavity is provided along an outer circumference of the lid.

15. The manufacturing method of the liquid container according to claim 4, wherein the lid is provided with a hole penetrating through the lid, and
wherein in the insert molding step, the bonding portion is filled with the bonding resin through the hole.

16. The liquid container according to claim 10, wherein a width of the cavity is smaller than a width of the partition rib.

* * * * *